E. C. HEAD.
FEED GEAR FOR DRILL PRESSES.
APPLICATION FILED SEPT. 25, 1915.

1,185,092.

Patented May 30, 1916.
4 SHEETS—SHEET 1.

WITNESSES:

INVENTOR
Ernest C. Head
BY
Edward R. Inmean
ATTORNEY

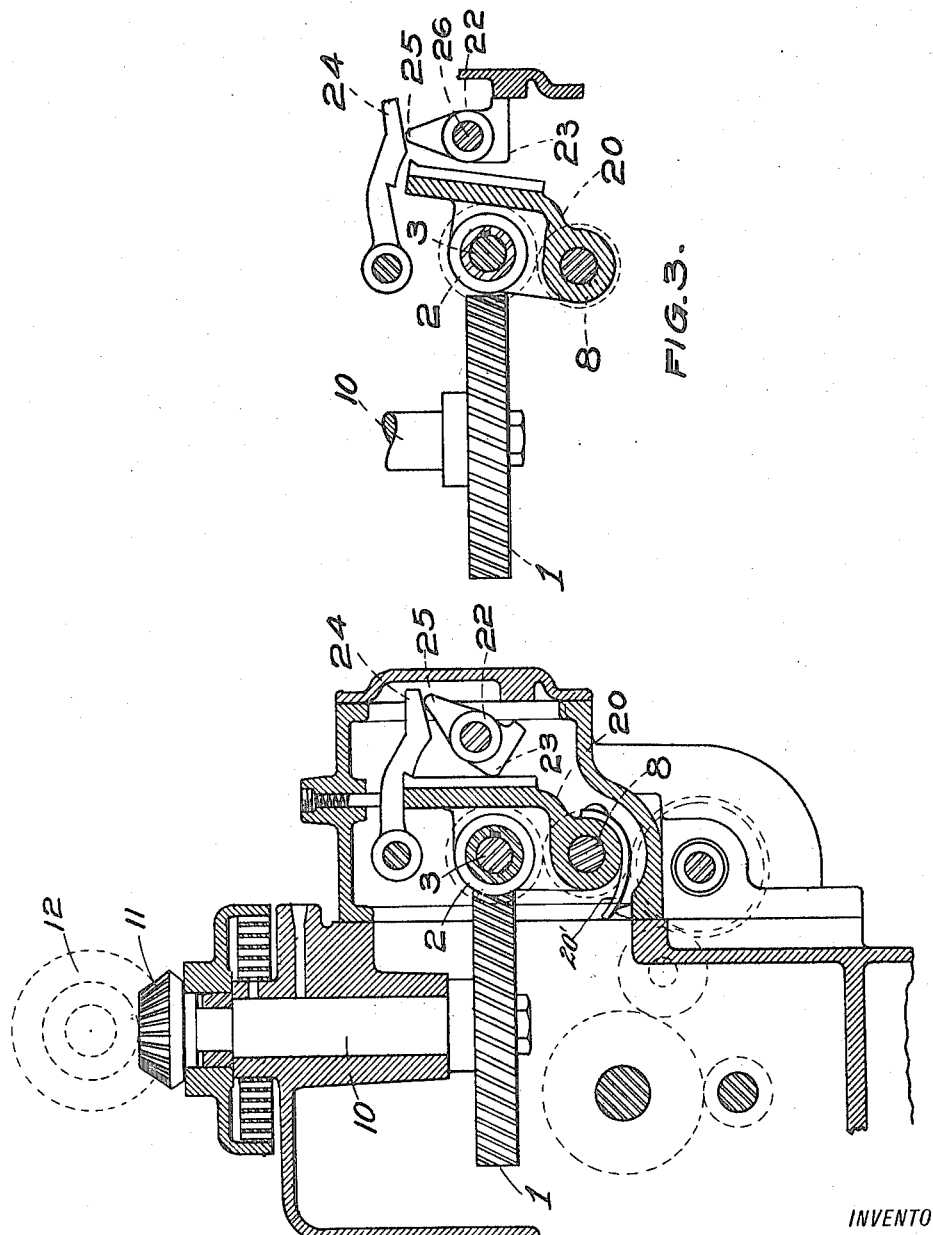

E. C. HEAD.
FEED GEAR FOR DRILL PRESSES.
APPLICATION FILED SEPT. 25, 1915.

1,185,092.

Patented May 30, 1916.
4 SHEETS—SHEET 3.

WITNESSES:

INVENTOR
Ernest C. Head
BY
Edward P. Jarman
ATTORNEY

E. C. HEAD.
FEED GEAR FOR DRILL PRESSES.
APPLICATION FILED SEPT. 25, 1915.

1,185,092.

Patented May 30, 1916.
4 SHEETS—SHEET 4.

INVENTOR
Ernest C. Head
BY
Edward R. Inman
ATTORNEY

UNITED STATES PATENT OFFICE.

ERNEST C. HEAD, OF FRANKLIN, PENNSYLVANIA, ASSIGNOR TO COLBURN MACHINE TOOL COMPANY, OF FRANKLIN, PENNSYLVANIA, A CORPORATION OF PENNSYLVANIA.

FEED-GEAR FOR DRILL-PRESSES.

1,185,092.  Specification of Letters Patent.  Patented May 30, 1916.

Application filed September 25, 1915. Serial No. 52,634.

*To all whom it may concern:*

Be it known that I, ERNEST C. HEAD, a citizen of the United States, residing at Franklin, in the county of Venango and State of Pennsylvania, have invented certain new and useful Improvements in Feed-Gears for Drill-Presses, of which the following is a specification.

The object, construction and operation of my improved feed gear for drill presses, are herein set forth with sufficient clearness to enable those skilled in the art of machine-tool construction and operation, to make and use the same.

It is a well-known fact to all who are familiar with machine-tool construction, that drill presses are so equipped and arranged that the feed of the spindle may be caused by either power drive or by hand actuation, and that the rate of said power feed may be varied as the work, material and size of drill may require.

It is the object of this invention to provide a feed gear for the spindle of a drill press, wherein a single element is adapted to perform the plural functions of changing the rate of said power feed, which element may be so positioned as to be manually operable to cause the feed of the spindle by hand; said element is, in addition to the adaptations and functions mentioned arranged to be disengageable from the spindle, so that said spindle may be rapidly actuated, or quickly raised or lowered by means of another element specially provided for this purpose.

A further object of my invention is, to provide means whereby said power feed may be automatically disengaged and discontinued at any desired, pre-determined point.

The embodiment of my invention is clearly illustrated in the accompanying drawings, the various figures of which are as follows:—

Figure 1:
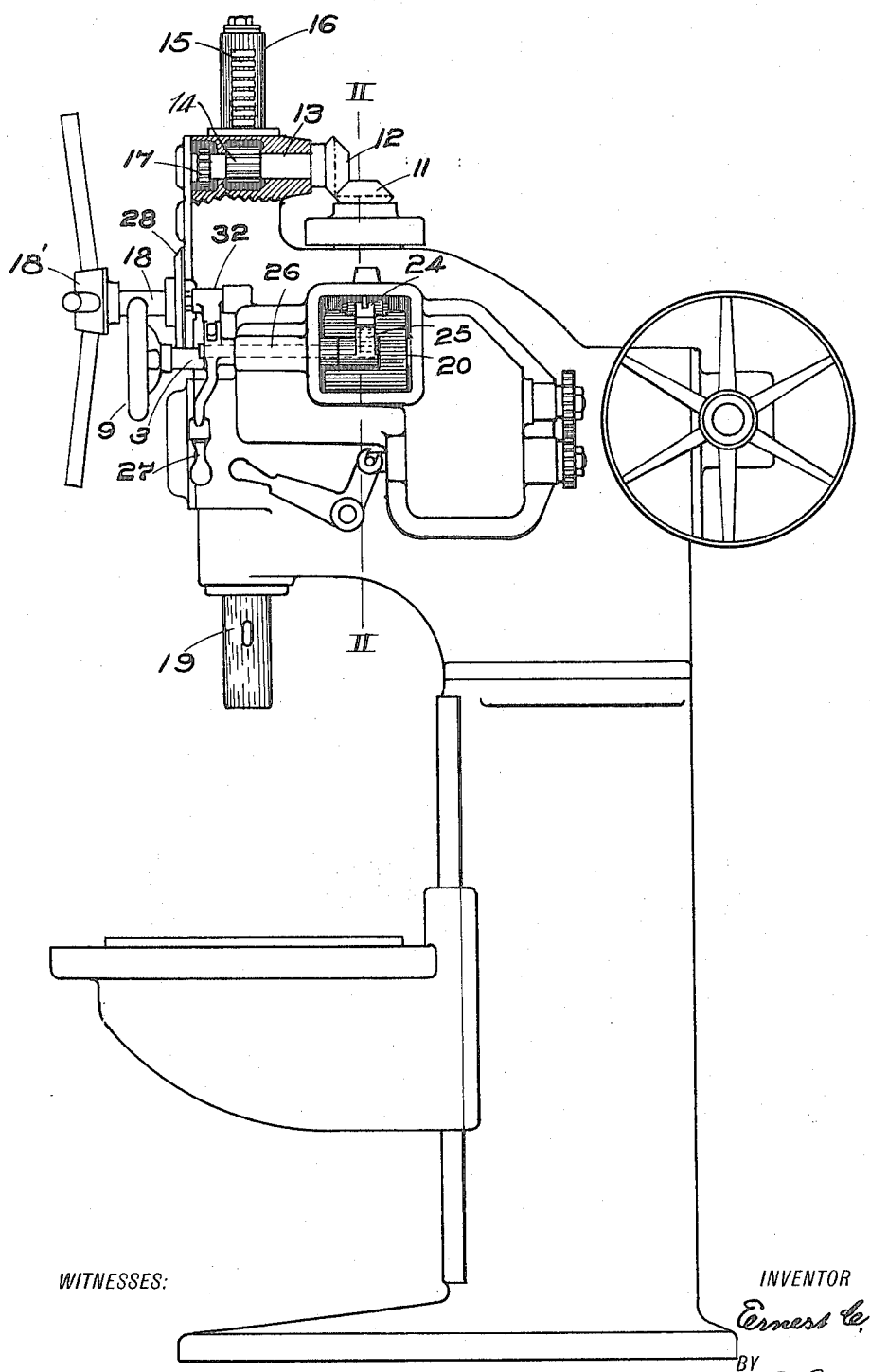
Figure 4:
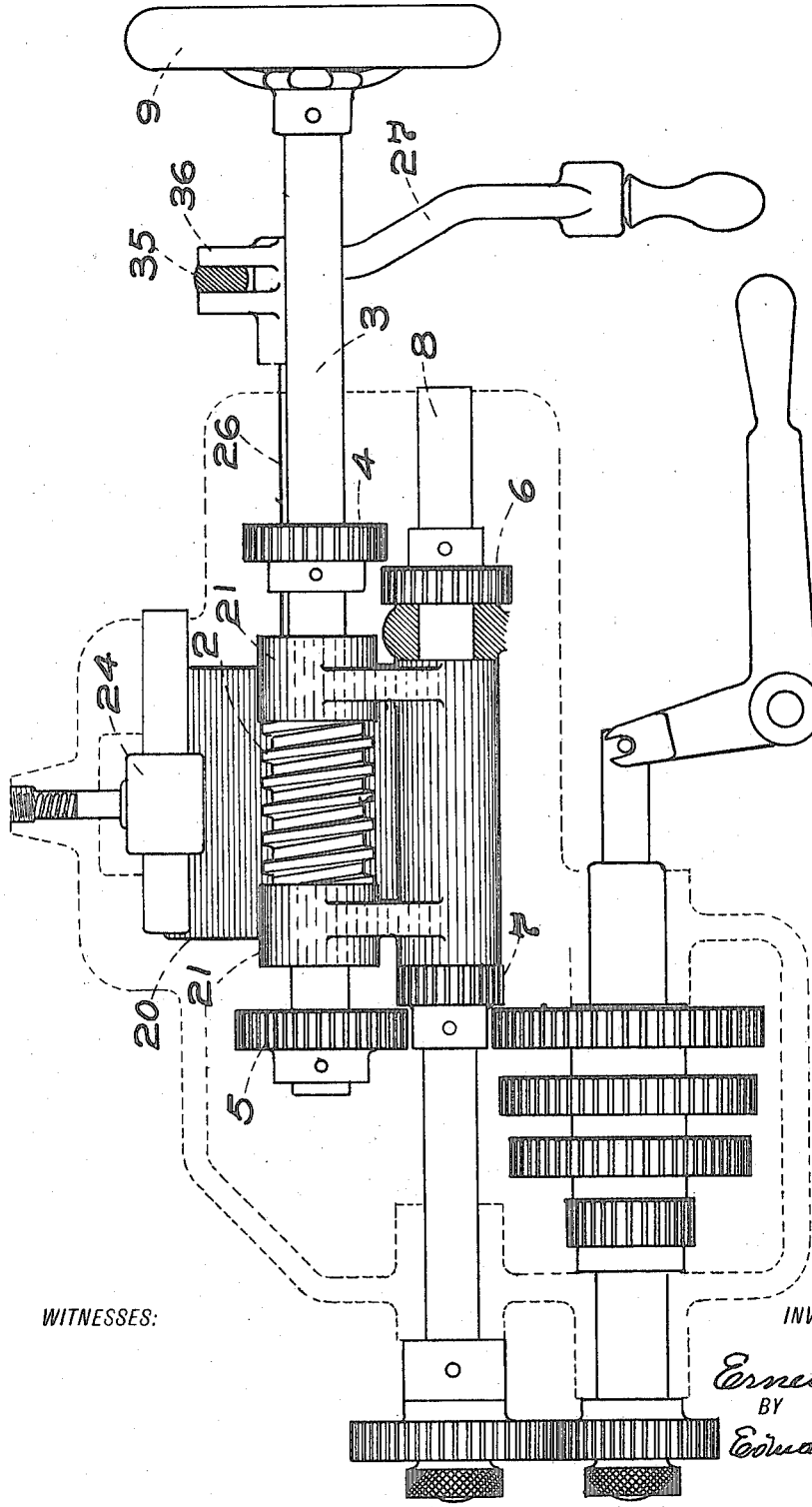
Figure 5:
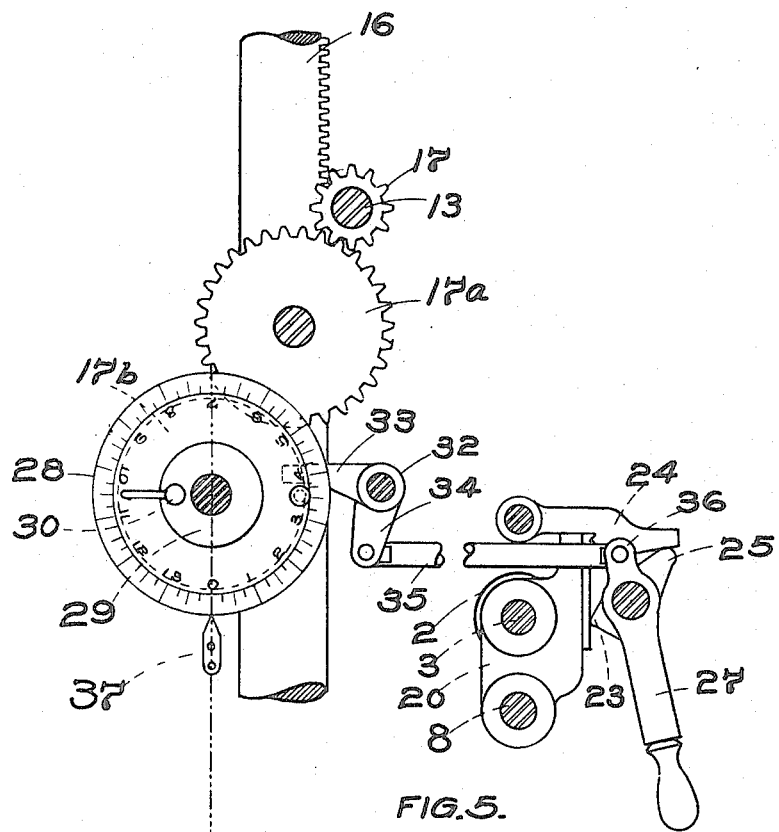
Figure 6:
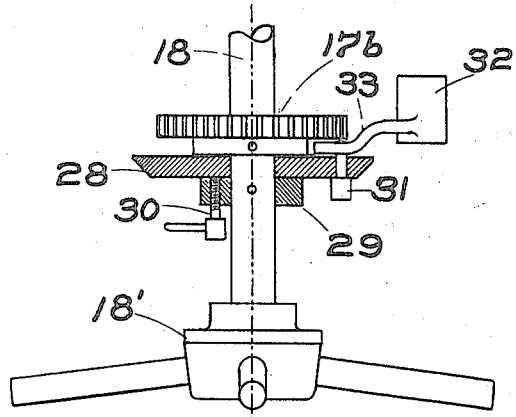

Figure 1 is a side elevation of a drill press embodying my invention, the cover of the feed-gear-case being removed to show other portions. Fig. 2 is a section on line II—II of Fig. 1. Fig. 3 is a portion of the view shown in Fig. 2, showing the feed disengaged so that the spindle may be rapidly raised or lowered by means of the rapid-traverse element. Fig. 4 is an inner elevation of that portion of the feed gearing which particularly embodies the main features of my invention. Figs. 5 and 6 show my automatic stop-mechanism.

The construction illustrated in said drawings is substantially as follows: The essential elements of my invention comprise a worm gear, consisting of a gear 1, and the worm 2, which worm is mounted upon and driven by a shaft 3, which is movable longitudinally through said worm. Said shaft 3 is also provided with spur gears 4 and 5, which are rigidly affixed to and operable to revolve said shaft 3 and said worm 2. Said longitudinal movement of said shaft 3 permits the engagement of gear 5 with gear 7 or the engagement of gear 4 with gear 6 as desired, and whereby a change of speed is obtainable, owing to the fact that the ratio between gears 4 and 6 differs from the ratio between gears 5 and 7. Said gears 6 and 7 are operably mounted upon shaft 8 which is power driven by means of a suitable train of gearing, a portion only of which is shown in Fig. 4; when either pair of gears 4—6 or 5—7 are in mesh, the spindle of the drill-press will be fed by power, but when said gears are in the non-meshing position shown in Fig. 4, which I term the neutral position, the hand-wheel 9 is operable to revolve said worm 2 to feed the spindle by hand.

The worm-wheel 1 is rigidly affixed to the revoluble, vertical shaft, 10, and rigidly affixed to the upper end of said shaft is a bevel gear 11 which meshes with and drives the gear 12, that is rigidly affixed to shaft 13, and upon said shaft 13 is mounted or formed integral therewith, a pinion 14 which engages the rack 15 upon the spindle sleeve or quill 16, whereby the feed movement is imparted to said spindle.

To the forward end of shaft 13 is rigidly affixed a gear 17, which is operably connected, by a suitable train of gearing 17ª and 17ᵇ to the rapid-traverse shaft 18, whereby a rapid vertical movement may be imparted to the spindle 19, when the worm-gear 1 is released from its engagement with worm 2, as shown in Fig. 3. For the purpose of providing for said disengagement of said worm and its wheel or gear, I have devised the following construction, which is one of the main features of my invention: Said worm 2 is mounted in a swinging or oscillating bracket 20, the pivotal or hinge element of which is the shaft 8, upon which said gears 6 and 7 are rigidly mounted. Said bracket 20 is provided with bearings 21, 21, for said worm-shaft 3. For the purpose of actuating said bracket 20, so as to cause the coöperative engagement of the worm gear, as shown in Fig. 2, or the disengagement of same as shown in Fig. 3, I provide a cam 22, the heel 23 of which, is adapted to impinge upon the adjacent side of said bracket 20 and to thereby move the same into the engaged operative position, Fig. 2, in which position it is retained by the latch 24 which is adapted to engage the upper edge of said bracket. Said cam 22 is provided with a point 25, adapted to raise and disengage said latch from said bracket, whereupon said bracket swings outwardly to the position shown in Fig. 3, which, at the same time causes said disengagement of worm 2 from its wheel 1. If found desirable, a suitable spring as 20' or equivalent element may be used to assist the disengagement of said worm 2 from wheel 1, said spring is suitably connected to the bracket 20, to throw the same outward when latch 24 is disengaged but the use of such spring is not deemed essential. Cam 22 is rigidly attached to a shaft 26, to the outer end of which is secured the actuating lever 27. Both, the force of gravity and the action of the worm against its wheel are deemed sufficient to throw said bracket outward to the position shown in Fig. 3, when the same is released from the retaining action of said cam-heel 23, though, as above stated, a spring 20' may be employed for this purpose if found desirable.

From the foregoing description it will be readily understood that the hand-wheel 9 is operable to move shaft 3 longitudinally through worm 2, and to shift the gears 4, 5, into engagement with their respective coöperating drive gears 6, 7, whereby the rate of power-feed is variable: It will also be readily understood that, when said gears 4, 5, are in the neutral position, as shown in Fig. 4, said hand-wheel is operable to cause the manual or hand-feed of the spindle, and, as previously pointed out, when bracket 20 is in the position shown in Fig. 3, and worm 2 is disengaged from wheel 1, said wheel is freely revoluble and the spindle 19 may then be moved up or down by means of the rapid-traverse wheel 18' through the medium of said train of gearing 17$^b$, 17$^a$, and 17, the latter being rigidly attached to the shaft 13 which carries the pinion 14 that engages the rack upon the spindle quill or sleeve 16.

My automatic stop mechanism is shown especially in Figs. 5 and 6, and comprises the following elements: An index disk 28 is revolubly mounted upon shaft 18, between the rigidly-affixed hub of gear 17$^b$ and the rigidly-affixed collar 29; passing through said collar 29 is a set-screw 30, the inner end of which is adapted to bear upon the adjacent face of said disk and to thereby lock the same non-rotatively upon said shaft 18; said disk carries, near its outer edge and upon its inner face, an actuating-pin 31. A trip-element consisting of a bell-crank 32 is suitably mounted upon the frame of the press in proximity to said disk, and one arm, 33, of said trip-element extends into juxtaposition to the inner face of said disk 28 and is so positioned as to encroach upon the path of said pin 31 as said disk revolves. To the other arm, 34, of said bell-crank is attached one end of a reach-rod 35, the other end of said rod being attached to the upper extension 36 of the lever 27. When the drill press is in operation and said pin 31 comes into contact with said arm 33, it actuates the bell-crank in such manner that cam 25 impinges upon latch 24 and disengages same from bracket 20, thus permitting said bracket to swing to the disengaged position shown in Fig. 3, which discontinues the power-actuation of the feed.

As previously stated, the index disk 28 is revoluble upon its shaft, but may be non-revolubly locked in any desired position of its revolubility by the set screw 30. Said disk 28 is supplied with numbered graduations, Fig. 5, the numerals of which indicate the depth, in any desired system of measurement, that the drill will travel when a certain number is set opposite the index 37, then when pin 31 comes into contact with arm 33 and actuates the bell-crank, said actuation is transmitted to shaft 26 and cam 25, which trips the latch 24, thus causing the disengagement of worm 2 from the gear 1, thereby discontinuing the power feed.

When lever 27 is actuated to restore worm 2 to the operative position, this also automatically and simultaneously replaces arm 33 to the position wherein it is actuable by pin 31, as and for the purpose stated.

I claim the following:

1. The combination with the spindle of a drillpress of a train of gearing adapted to cause the feed movement of said spindle, said train of gearing comprising among its elements a worm gear, a shaft for the worm of said gear operable to revolve said worm, a second shaft mounted in proximity to said worm shaft and arranged parallel therewith, means adapted to transmit motion from said second shaft to said worm-shaft, a swinging bracket arranged to carry said worm-shaft and said worm, said bracket being pivotally mounted upon said second shaft whereby said worm is adapted to be disengageable from the wheel of said gear, and means for automatically causing such disengagement at a pre-determined point.

2. The combination with the spindle of a drillpress of a train of gearing adapted to cause the feed movement of said spindle, said train of gearing comprising among its elements a worm gear, a shaft for the worm of said gear operable to revolve said worm, a second shaft mounted in proximity to said worm shaft and arranged parallel therewith, means adapted to transmit motion from said second shaft to said worm shaft, a bracket arranged to carry said worm-shaft, said bracket being pivotally mounted upon said second shaft whereby said worm is adapted to be disengageable from its actuative engagement with the wheel of said worm gear, means for automatically causing such disengagement at a predetermined point, and means adapted to pre-determine and fix said point.

3. The combination with the spindle of a drillpress, of a train of gearing adapted to cause the feed movement of said spindle, said train of gearing comprising among its elements a worm gear, a shaft for the worm of said gear operable to revolve said worm, said shaft being longitudinally movable through said worm, a second shaft mounted in proximity to said worm-shaft and arranged parallel therewith, means for transmitting variable motion to said worm-shaft from said second shaft, said variation being producible through said longitudinal movability of said worm-shaft, a swinging bracket arranged to carry said worm and its shaft, said bracket being pivotally mounted upon said second shaft, whereby said worm is adapted to be disengageable from said gear, means adapted to automatically cause such disengagement, and means adapted to predetermine and fix the point of such disengagement, for the purpose specified.

4. The combination with the spindle of a drillpress of a train of gearing operable to cause the feed movement of said spindle, said train of gearing comprising among its elements a worm gear, a shaft for the worm of said gear operable to revolve said worm, a second shaft mounted in proximity to said worm-shaft and arranged parallel therewith, means for transmitting motion from said second shaft to said worm-shaft, a swinging bracket adapted to carry said worm and its shaft, said bracket being pivotally mounted upon said second shaft, whereby said worm is adapted to be disengaged from its coöperating gear for the purpose specified, a trip-element automatically actuable to cause such disengagement, and means operable to return said worm to its engaged, operative position and to simultaneously, automatically replace said trip element to its actuable position.

5. The combination with the spindle of a drillpress of a train of gearing adapted to cause the feed movement of said spindle, said train of gearing comprising among its elements a worm gear, a shaft for the worm of said gear operable to revolve said worm, said shaft being longitudinally movable through said worm, a second shaft mounted in proximity to said worm-shaft and arranged parallel therewith, means for transmitting motion from said second shaft to said worm shaft, a swinging bracket arranged to carry said worm and its shaft, said bracket being swingingly mounted upon said second shaft, whereby said worm is adapted to be disengageable from its gear, means automatically operable to cause such disengagement, means operable to return said worm to its operative, engaged position, and releasable means adapted to retain said worm in said last-mentioned position.

6. The combination with the spindle of a drillpress of a train of gearing adapted to cause the feed movement of said spindle, said train of gearing comprising among its elements a worm gear, a shaft for the worm of said gear operable to revolve said worm, said shaft being longitudinally movable in said worm, a second shaft mounted in proximity to said worm-shaft and arranged parallel therewith, means for transmitting variable motion from said second shaft to said worm-shaft, said variation being producible by said longitudinal movement of said worm-shaft, a swinging bracket arranged to carry said worm and its shaft, said bracket being swingingly mounted upon said second shaft whereby said worm is made disengageable from its wheel, a trip-element automatically actuable to cause said disengagement, means operable to return said worm to its engaged, operative position and to simultaneously automatically replace said trip-element in its actuable position.

7. The combination with the spindle of a drillpress of a train of gearing adapted to cause the feed movement of said spindle, said train of gearing comprising among its elements a worm gear, a shaft for the worm of said gear operable to revolve said worm, said shaft being longitudinally movable in said worm, a second shaft mounted in proximity to said worm shaft and arranged parallel therewith, means for transmitting motion from said second shaft to said worm-shaft, a swinging bracket carrying said worm and its shaft, said bracket being swingingly mounted upon said second shaft, whereby said worm is adapted to be disengageable from its gear, means actuable to automatically cause such disengagement, means adapted to pre-determine and fix the point of such disengagement, means operable to return said bracket and said worm to its engaged operative position, and a disengageable latch adapted to retain said bracket in said last-mentioned position.

8. The combination with the spindle of a drillpress of a train of gearing adapted to cause the feed movement of said spindle, said train of gearing comprising among its elements a worm gear, a shaft for the worm of said gear operable to revolve said worm, said shaft being longitudinally movable in said worm, a second shaft mounted in proximity to said worm-shaft and arranged parallel therewith, means for transmitting variable motion from said second shaft to said worm-shaft, said variation being producible through said longitudinal movement of said worm-shaft, a swinging bracket in which said worm and worm-shaft are mounted, said bracket being swingingly mounted upon said second shaft whereby said worm is adapted to be disengageable from its gear, a trip-element operable to automatically cause such disengagement, means adapted to predetermine and fix the point of such disengagement, means operable to return said worm to its engaged operative position and to automatically simultaneously replace said trip-element in its actuable position.

In testimony whereof I affix my signature in presence of two witnesses.

ERNEST C. HEAD.

Witnesses:
  E. E. HUMES,
  M. E. BARROW.